United States Patent [19]

Horst et al.

[11] 4,034,211
[45] July 5, 1977

[54] SYSTEM AND METHOD FOR PROVIDING A SECURITY CHECK ON A CREDIT CARD

[75] Inventors: William R. Horst, Dayton; William J. Hale, Kettering, both of Ohio

[73] Assignee: NCR Corporation, Dayton, Ohio

[22] Filed: June 20, 1975

[21] Appl. No.: 588,937

[52] U.S. Cl. ............... 235/61.12 N; 235/61.11 E; 235/61.7 B; 340/173 LM; 350/162 SF; 356/71
[51] Int. Cl.² ............... G06K 19/06; G06K 7/14; G02B 5/18; G06K 19/08
[58] Field of Search ............ 350/162, 163; 356/71; 340/173 LM, 146.3 P; 235/61.11 E, 61.11 D, 61.12 N, 61.12 R, 61.7 B; 383/7; 250/568, 569, 566, 567

[56] References Cited

UNITED STATES PATENTS

| | | | |
|---|---|---|---|
| 3,245,697 | 4/1966 | Nugent | 235/61.12 N |
| 3,455,577 | 7/1969 | Kikumoto | 235/61.12 N |
| 3,488,124 | 1/1970 | Lamberts | 356/71 |
| 3,536,894 | 10/1970 | Travioli | 235/61.6 R |
| 3,612,835 | 10/1971 | Andrews | 235/61.11 D |
| 3,635,545 | 1/1972 | Vankerkhove | 350/163 |
| 3,656,838 | 4/1972 | Bryant | 350/162 SF |
| 3,706,874 | 12/1972 | Lockard | 235/61.11 E |
| 3,740,530 | 6/1973 | Hoffer | 235/61.7 B |
| 3,790,754 | 2/1974 | Black | 235/61.7 B |
| 3,793,600 | 2/1974 | Grosbard | 235/61.12 N |
| 3,814,904 | 6/1974 | Russell | 235/61.11 E |
| 3,829,662 | 8/1974 | Furahashi | 235/61.12 R |
| 3,836,754 | 9/1974 | Toye | 235/61.12 N |
| 3,838,401 | 9/1974 | Graf | 340/173 LM |

*Primary Examiner*—Robert M. Kilgore
*Attorney, Agent, or Firm*—J. T. Cavender; Albert L. Sessler, Jr.; Elmer Wargo

[57] ABSTRACT

A system and method for providing a security check on a credit card. The credit card has first data recorded thereon in the form of optical gratings to provide for card uniqueness and second data recorded thereon in a magnetic track also located on the card. The optical gratings on the card cannot be reproduced by "skimming" or without destroying the card itself. When the magnetic track is recorded by a bank issuing the card, some reference to the first data on the card is included and encrypted on the magnetic track by the bank's encrypting hardware so as to eliminate fraudulent duplication or use of the card. The first data, which is unique to the card, is compared with selected portions of the encrypted second data to provide a security check to determine the validity of the card being used. The optical gratings are embossed on an aluminized plastic strip which is sandwiched between plastic sheets in the credit card to form a non-separable and tamperproof card structure.

12 Claims, 8 Drawing Figures

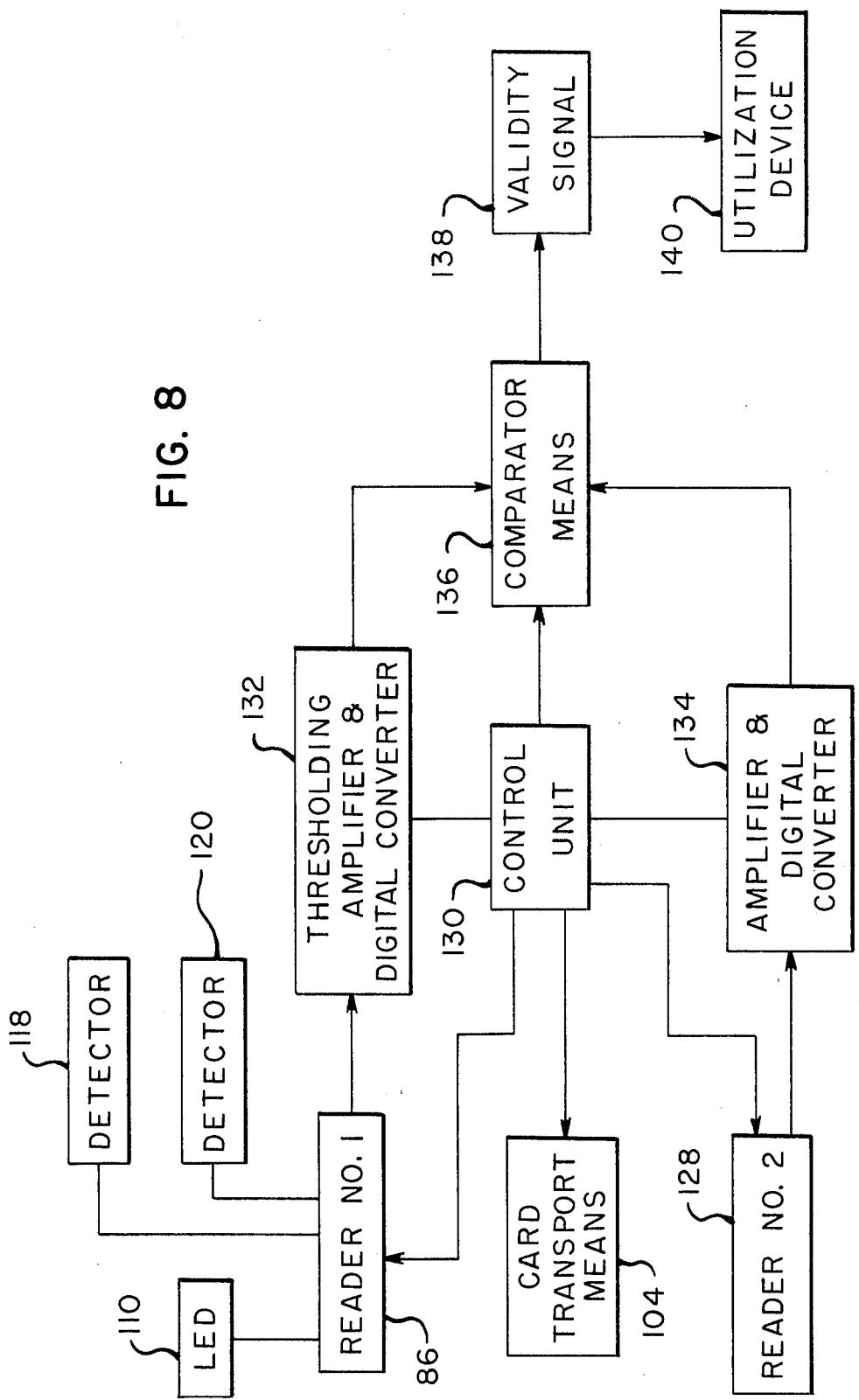

SYSTEM AND METHOD FOR PROVIDING A SECURITY CHECK ON A CREDIT CARD

BACKGROUND OF THE INVENTION

This invention relates to a system and a method for providing a security check on a record medium or credit card used in security of financial systems and the like, and to a novel record medium or credit card construction used therein and its associated method of manufacturing.

Recent developments in security or financial systems, credit systems, funds transfer systems, and the like, rely heavily on the use of record media or credit cards having magnetic stripes or tracks thereon with various data such as account number, credit limits, credit status, credit available for use, and the like, being recorded magnetically on the stripes. Such systems have to be designed to avoid or minimize the fraudulent use of such record media or credit cards.

One of the ways in which fraudulent use of such credit cards is made is to counterfeit the cards by mass reproduction techniques which "skim" or transfer the data magnetically recorded on a valid card to a fraudulent one.

The problem of trying to prevent the unauthorized duplication of or use of valid credit cards used in financial, credit or security systems, and the like, is a very extensive one as evidenced by the variety of different techniques tried to avoid the problem and disclosed in the following U.S. Pat. Nos.: 3,604,901; 3,759,179; 3,620,590; 3,790,754; 3,644,716; 3,808,404, and 3,831,008. None of these prior art patents shows the approach used in this invention to prevent the unauthorized duplication or use of valid credit cards. U.S. Pat. No. 3,620,590 for example shows the use of a credit card having a scrambled holographic image and a secret number containing the signature of the bearer, therein, and a special apparatus for unscrambling the image to display the signature and number when the card is used to make a purchase.

Some prior art techniques for providing a security system for checking on the validity of a credit card used in the system are shown in the following U.S. Pat. No. which are merely typical of the prior art: U.S. Pat. Nos. 3,401,830; 3,691,527, and 3,513,298; 3,697,729. None of these patents discloses a system which uses diffraction gratings on a credit card in conjunction with a second form of data like a magnetic track to provide a security check on the credit card being used in the system.

Some systems for recording digital information using diffraction gratings are shown in the following U.S. Pat. Nos.: 3,312,955; 3,599,147; 3,392,400; 3,635,545; 3,523,734, 3,656,838, and 3,838,401. While these patents show the use of diffraction gratings in systems for recording information, the systems employ structure which is quite different from that employed in this invention, i.e. several patents disclose grating plates and slotted masks to record data on a photographic film, or circular rotating mirrors in combination with grating plates for character identification.

SUMMARY OF THE INVENTION

One of the objects of this invention was to develop a credit "card uniqueness" so as to prevent the "skimming" or mass counterfeiting of credit cards. The concept of card uniqueness is based on the principle of fabricating a plurality of credit cards in such a manner that no two cards are identical, i.e., each card has a unique feature contained therein which is unlike any other card, and which unique feature cannot be duplicated or transferred to fraudulent credit cards during attempts to "mass produce" fraudulent credit cards from valid ones. Because the credit card also contains data in a second form like magnetic stripe data, and because the magnetic stripe data contains encrypted information which relates to the unique feature of the card which cannot be "skimmed", an appropriately designed reader or readers can be used to read both the magnetic data and the uniqueness feature of the card. If a "match" occurs from both forms of data read, a valid card is indicated, and if a match of both forms of data does not occur, the specific card being read is rejected as being illegal.

The unique feature for each credit card is obtained through the use of optical gratings which are imbedded within the construction of a credit card by a novel method in such a manner as to enable their being read while preventing their being tampered with or "skimmed" for fraudulent purposes.

Another object of this invention is to provide a security system for checking on the validity of record media or credit cards used in security or financial systems to satisfy both the banking community and the users of such systems.

Still another object of this invention is to provide a method for providing a security check on a credit card used in financial or security systems.

Some of the advantages of the credit card uniqueness as developed under this invention are as follows:

a. The card is unique within a selected probability, eg., 1 in 10,000,000;

b. The uniqueness feature is difficult to create, duplicate, or alter;

c. The uniqueness feature is readily machine readable;

d. The method for manufacturing the card uniqueness feature is compatible with present methods of card fabrication;

e. The card developed hereunder exhibits acceptable life under normal user conditions;

f. The uniqueness feature is not harmful to the user;

g. The uniqueness feature fits into available credit card space; and h. The cost of producing a credit card under this invention is low when considered from the standpoint of an authorized producer of the cards; however, the cost of producing an illegal card when considered from the standpoint of an illegal producer is high, which feature adds to the security of the system.

These advantages and others will be more readily understood from the following detailed description and drawings.

BRIEF DESCRIPTION OF THE DRAWINGS

FIG. 8 is a general schematic diagram showing a security system for comparing the first and second data read from the first and second reading shown in FIG. 7 and for issuing a validity signal based on a comparison of the first and second data read.

DETAILED DESCRIPTION OF THE INVENTION

Figure 1:
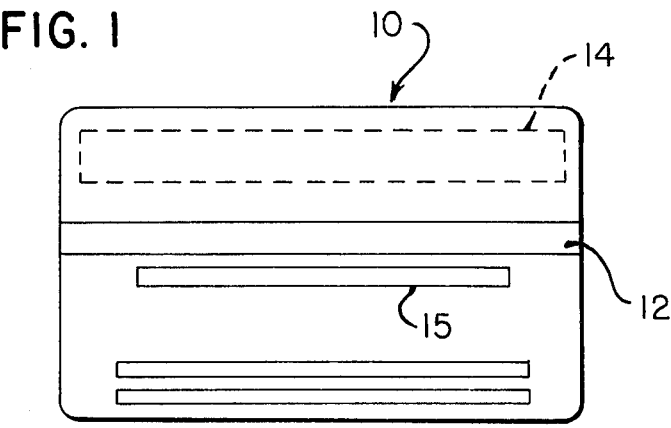
FIG. 1 is a plan view of a record medium like a credit card made according to this invention having first data thereon in the form of diffraction gratings and having second data thereon in the form of magnetic recordings on a magnetic stripe.

By a common definition, credit card uniqueness means that any particular card is different from any other card. The prior art credit cards are unique in that they contain embossed data, information stored on a magnetic track, a signature, and perhaps a photograph of the user of the card; however with unmanned terminals like cash dispensing machines for example, it is not practical to utilize the signature or photograph in any present security system for checking on the validity of a credit card used in such unmanned terminals. As far as the unmanned terminal is concerned, the only unique features of the card lie in the recorded magnetic track.

The magnetic recording techniques which are used on present day credit cards are highly developed and well known, consequently, many people have the capability of detecting and re-recording the magnetic signals used on the magnetic tracks of the cards. In fact, it has been shown recently, that an unlimited number of very good copies of magnetic data can be reproduced from a card having a magnetic track thereon simply by pressing another magnetic track against the track on the card and heating it with an electric iron. Accordingly, the present-day magnetic track on credit cards does not possess the type of uniqueness which will prevent mass duplication of the cards used in automated banking equipment or other systems requiring a thorough security check on the credit card being used therein.

The present invention provides the kind of card uniqueness and a security system which having the advantages recited earlier herein.

The system for providing card uniqueness under this invention employs the principles of an optical diffraction grating.

Optical gratings consist of a number of parallel straight lines at a given spacing across a surface. The lines may exist in the form of opaque printed lines, transparent slots, reflective bars or lines cut into the surface of an object by conventional grating ruling machines. Optical gratings, when illuminated by (an essentially monochromatic) a beam of light, will effectively cause a portion of the light beam to shift in direction, the new direction being at a specific angle with respect to the initial beam of light. The rays of light which constitute the beam traveling in the new direction are called diffracted rays, and their presence is readily detected by a photodetector placed at a precisely determined location. The presence or absence of a particular grating will therefore produce a binary, digital-type electrical signal from the associated photodetector. The location of the photodetector corresponding to the detection of a particular diffraction grating is determined by the spacing of the parallel lines of the grating and the angular orientation of the lines relative to the beam of light.

Stated in general terms, the card uniqueness feature of the present invention consists of a series of small, individual diffraction gratings arranged on a credit card in a predetermined order. When the magnetic track is to be recorded by a bank, for example, which will issue the credit card, the bank utilizes a reader to read the particular diffraction gratings on the card, and through its encrypting hardware it will encrypt the data in the diffraction gratings onto the magnetic track, so that no one other than the bank issuing the card can change the magnetically recorded data or number. Any attempts at copying or skimming the data for fraudulent purposes will result in a mismatch between the magnetic track data and the diffraction grating data, when it is read in use, thereby giving an indication that the card is an invalid one.

Figure 2:
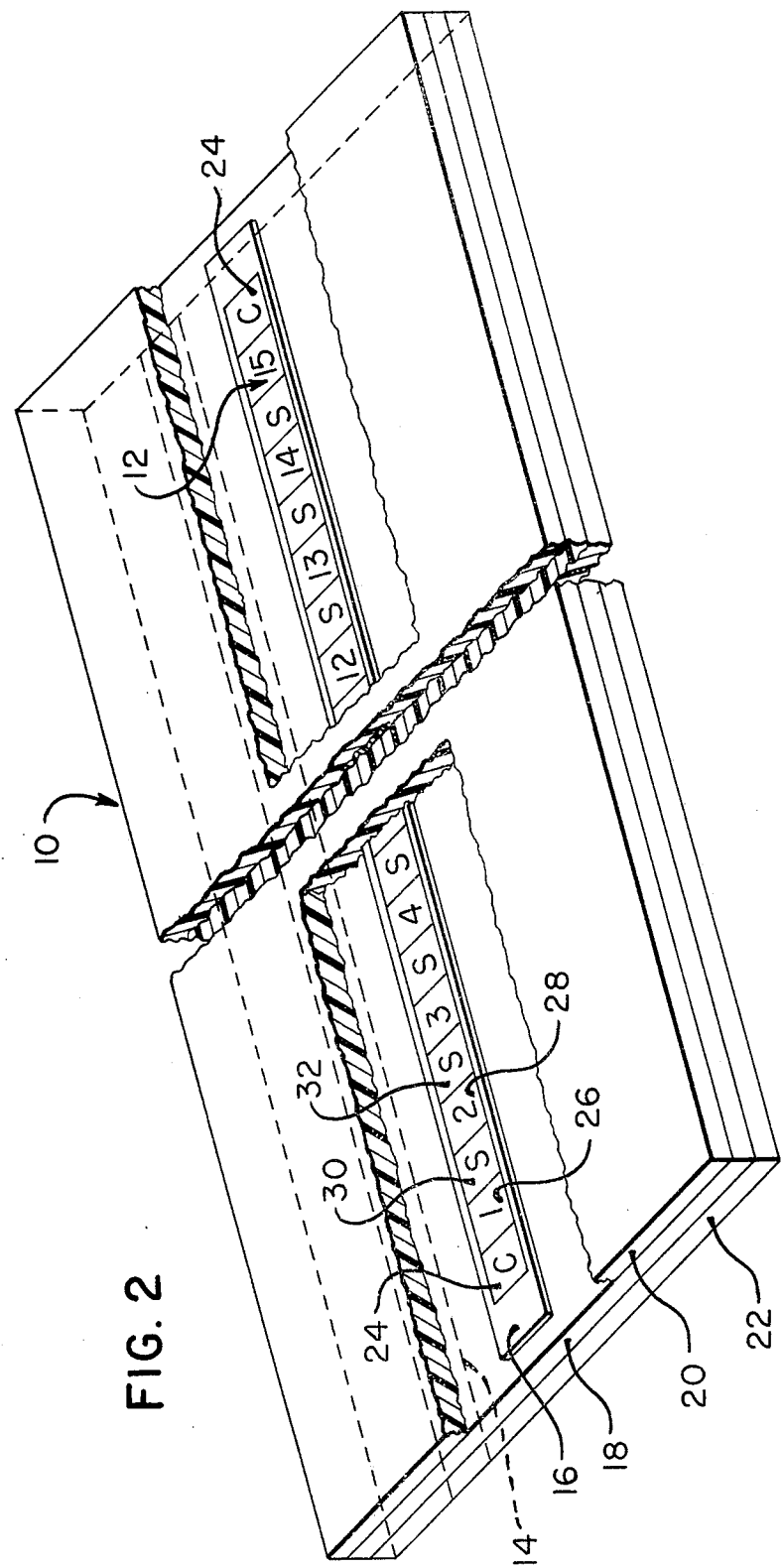
FIG. 2 is an enlarged, perspective view of the credit card shown in FIG. 1 showing more details of the construction thereof and the diffraction gratings thereon.

FIGS. 1 and 2 show a credit card 10 which embodies the features of this invention. The credit card 10 includes first data 12 which is recorded thereon in the form of diffraction gratings and second data 14 which is recorded thereon in a second form as, for example, in a magnetic stripe or track. The card 10 may also have a card number 15 (shown as a rectangle in FIG. 1) which is embossed thereon.

In the embodiment shown, the first data 12 is recorded on a strip 16 (FIG. 2) of reflective plastic material, one preferred type of plastic material being sold under the trademark "Mylar" and being manufactured by E. I. Du Pont de Nemours & Co. The strip 16 is approximately one-fourth inch in width, about 0.002 inch in thickness and extends along the length of the card 10 parallel to the long sides of the rectangularly-shaped card 10. The strip 16, with the first data 12 thereon, is positioned on a generally planar body portion 18 of the card 10, and a layer 20 of transparent plastic covers said strip 16 and is sealed to the body portion 18 to enable the first data 12 to be read through the transparent layer 20. The layer 20 also protects the first data 12 on the card 10 against tampering, as any effort to peel off the transparent layer 20 to reach the first data 12 results in the first data 12 being destroyed, thereby making the first data tamperproof and immune to the skimming or transferring of data from a valid credit card to a fraudulent one as mentioned earlier herein. The usual printing appearing on the credit card is done on one or both sides of the body portion 18 so as to be visible through the transparent layer 20. Another transparent layer 22 of plastic material is secured to the remaining side of the body portion 18 so as to protect any printing which may be located on that side thereof. The second data 14 is recorded on a magnetic stripe located on the transparent layer 22 which second data may be located on the same side of the card on which the first data 12 is recorded, but preferably the second data 14 is located on the opposite side of the card from the first data 12.

Figure 3:
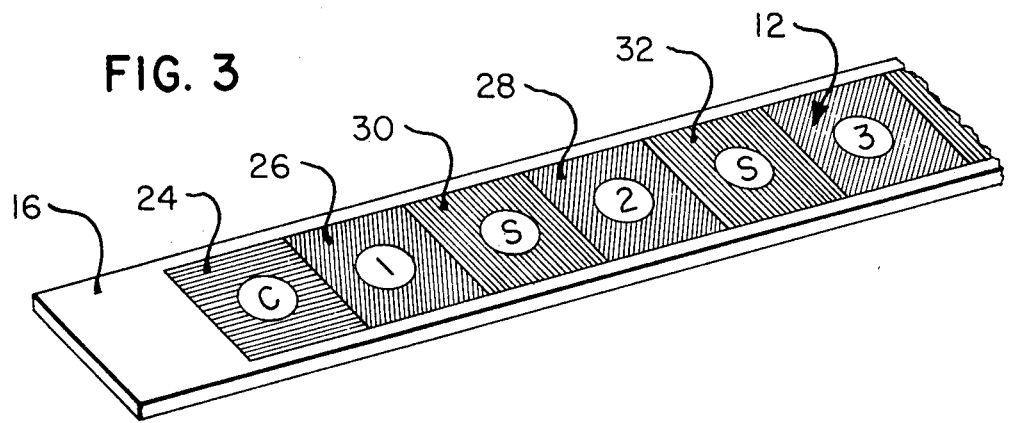
FIG. 3 is an enlarged perspective view of a strip of reflective plastic material having the diffraction gratings thereon and used in the credit card shown in FIG. 2.

The first data 12 recorded on the strip 16 is shown in greatly enlarged form in FIG. 3. The first data 12 includes: two control diffraction gratings 24 (also marked C in FIGS. 2 and 3) appearing at the ends of the strip 16, a plurality of data diffraction gratings like 26, 28 (to represent characters) also marked with an encircled 1, 2, etc., and a space grating like 30, 32 also marked with an encircled S, with one such space grating being located between consecutive character data diffraction gratings like 26, 28.

The diffraction gratings like 24, 26 and 30 are embossed on the strip 16 by a method shown in FIG. 4, which method will be described later herein. For the moment, it is sufficient to state that each diffraction grating like 26, 28 which is to repeat a different character, has its grating lines positioned at a different angle with respect to some reference line like the length of the strip 16. The two control diffraction gratings 24 are identical, and all of the space diffraction gratings like 30, 32 are identical. The particular code used in the embodiment shown utilizes 10 different diffraction gratings like 26, 28 for the data characters 0 to 9, a different diffraction grating 24 for the control diffraction gratings 24, and a different diffraction grating for the space diffraction gratings, like 30, 32, making a total of what might be considered 12 "characters" to be read by the reader shown in FIG. 7. In the embodiment shown in FIG. 2, there is provision for combinations of 15 data characters to be recorded, thereby producing billions of different uniqueness numbers which can be applied to the credit cards under this system. Naturally, the number of different characters to be used and the number of characters present on a credit card will depend upon the particular application in which the credit card 10 is to be used.

Figure 6:
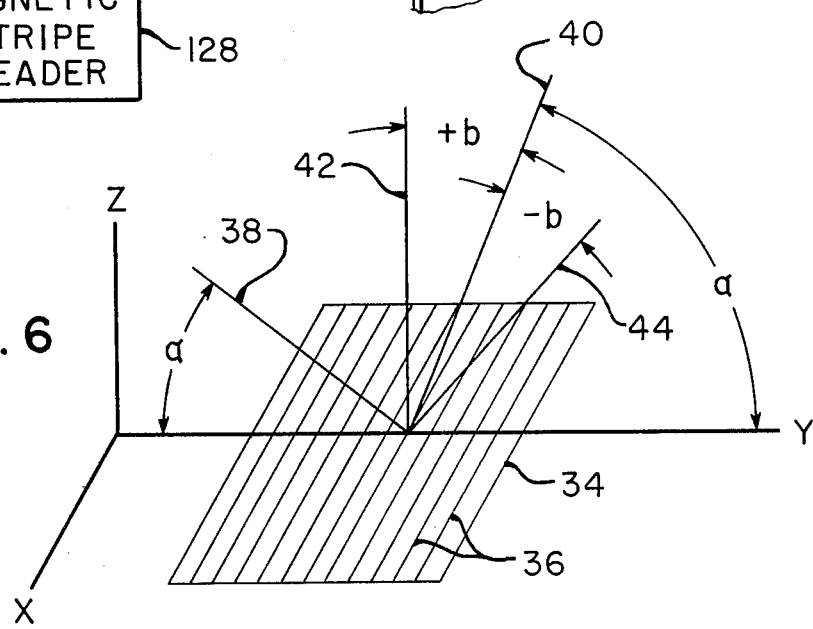
FIG. 6 is a general diagram showing a diffraction grating principle used in this invention.

Before proceeding with a discussion of the method of producing the diffraction gratings shown in FIG. 3, it will be useful to discuss diffraction grating principles as they relate to this invention. In this regard, FIG. 6 shows a reflective optical grating 34 having a mirrored surface thereon, being positioned in an X-Y plane, and having a plurality of equally-spaced parallel grating lines 36 formed thereon. An incoming light ray 38 at an angle (a) with respect to the X-Y plane, strikes the surface of the grating 34 and reflects as a ray 40 at the angle (a) due to the mirrored surface on the grating 34. Additionally due to the mirrored surface on the grating 34, two sets of diffracted rays 42 and 44 are generated. These rays 42 and 44 are first order diffracted rays with ray 42 being diffracted from the reflected ray 40 at a positive angle (b+) and with ray 44 being diffracted from the reflected ray 42 at a negative angle (b−); angles (b+) and (b−) are equal angles which lie on opposed sides on the reflected ray 40. The angles (b+) and (b−) are a function of the wavelength of the incoming light ray 38 divided by the pitch of the grating lines 36. The angular orientation of the grating lines with respect to an incoming light ray also determines the angular position of the existing rays. These diffraction grating principles are common knowledge and need not be discussed in further detail.

Figure 4:
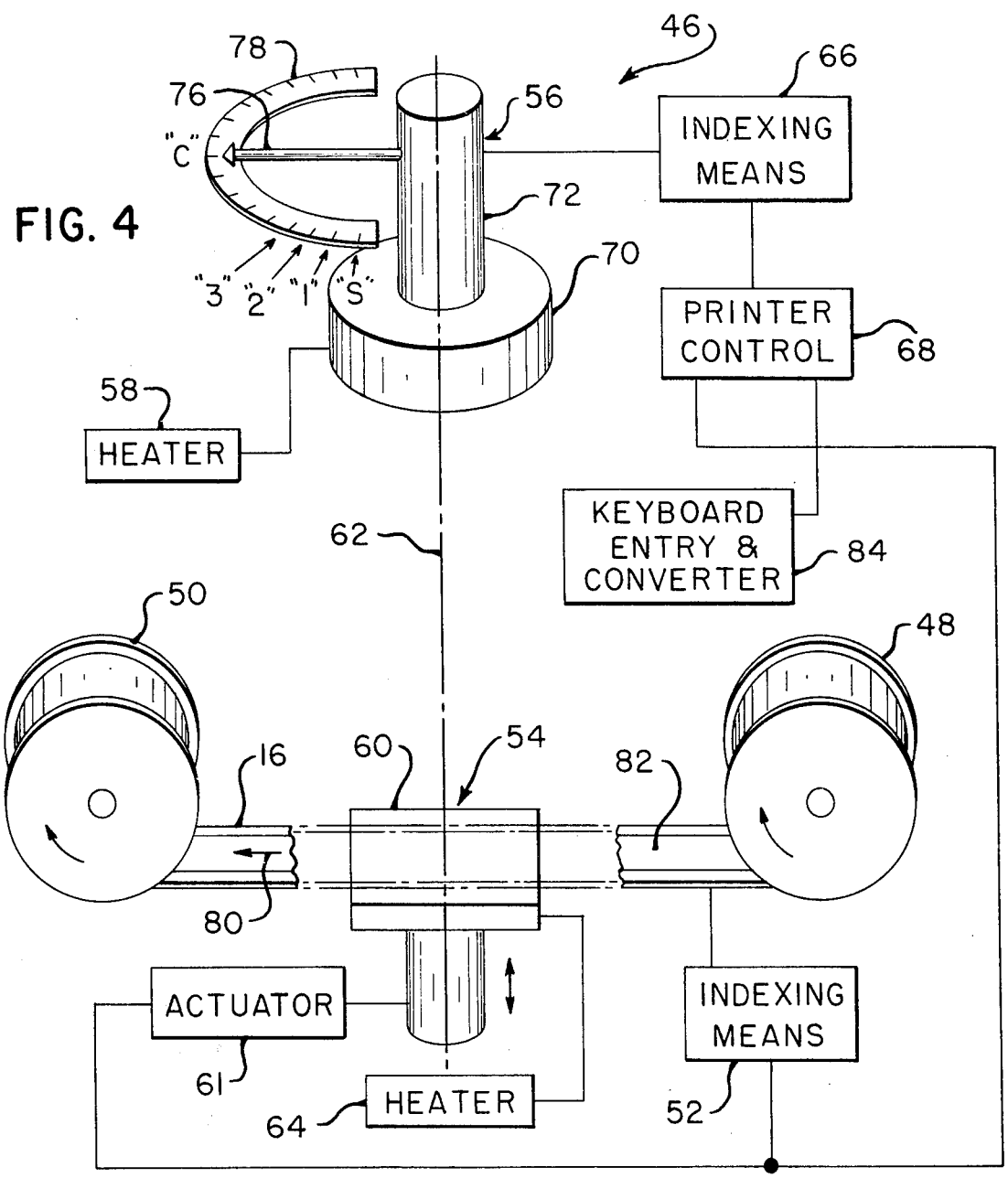
FIG. 4 is a general schematic view showing an embossing means used for producing the diffraction gratings shown in FIG. 3.

As alluded to earlier herein, FIG. 4 shows a method and apparatus designated generally as 46 for producing the diffraction gratings shown on the strip 16 in FIG. 3. The apparatus 46 includes a supply reel 48, a take up reel 50, and a conventional indexing means 52 for indexing the strip 16 to an embossing station 54 within the apparatus 46. The apparatus 46 also includes an embossing tool 56, having a conventional heater 58 associated therewith, a square platen 60 mounted for vertical reciprocal movement by a conventional actuator 61 along a center line 62 which is coincident with the longitudinal axis of the embossing tool 56, a conventional heater 64 associated with the square platen 60, a conventional indexing means 66 operatively associated with the embossing tool 56, and a conventional printer control 68 for controlling the various operations of the apparatus 46.

Figure 5:
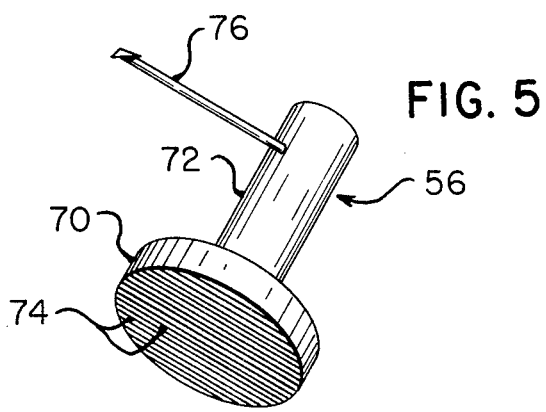
FIG. 5 is a perspective view of an embossing tool used in the embossing means shown in FIG. 4.

The embossing tool 56 has a cylindrical section 70 (FIGS. 4, 5) on the lower side of a rod 72 which is pivotally mounted in the frame means (not shown) of the embossing apparatus 46, and fixed against axial movement therein. The longitudinal axis of the rod 72 is coincident with the centerline 62. The lower side of the cylindrical section 70 has a plurality of evenly spaced, parallel lines 74 formed thereon by a conventional ruling process. In the embodiment shown, the embossing tool 56 has 350 lines per millimeter formed thereon; however, any convenient number of lines up to about 600 lines per millimeter may be formed thereon. The embossing tool 56 also has an indicator arm 76 extending from the rod 72 for use with a scale 78 to indicate the angle at which the lines 74 are embossed on the strip 16 with reference to arrow 80 which is parallel to the sides of the strip 16.

The particular code used in the embodiment best shown in FIG. 3 may be as follows. The control grating 24 has its lines 74 parallel to sides of the strip 16, and the space grating 30 has its lines formed perpendicular to arrow 80 (FIG. 4) or perpendicular to the sides of the strip 16. The remaining characters "0" to "9" may be formed at varying angles with respect to arrow 80. For example, the character "0" may be positioned at 80° with reference to arrow 80; the character "1" may be positioned at 70° with reference to arrow 80; the characters "2", "3", and "4" may be positioned at 60, 50, and 40 degrees respectively, with respect to arrow 80, etc., until all the characters used in the system are assigned angular orientations with respect to the arrow 80. Because only 12 "characters" are used in this system, only 12 different angular positions are necessary for the coding arrangement shown, and with a 10° variation for each character, the entire coding arrangement can be accommodated within a range of 180° to avoid the problem of a 10° angle for example being misread as a 190° angle and vice versa. Naturally, the particular coding arrangement disclosed herein is merely illustrative of many different combinations which can be realized by using the principles of this invention.

The method for embossing the various diffraction gratings shown on the strip 16 best shown in FIG. 3 as follows: The strip 16 is unwound from the reel 48 of aluminized plastic with the reflective portion 82 of the strip 16 facing the embossing tool 56 as shown in FIG. 4 by the conventional indexing means 52. The particular characters to be embossed may be manually set upon the apparatus 46 by rotating the arm 76 of the embossing tool 56 to the particular angular position represented by the character whose diffraction grating is to be embossed on the strip 16. For example, starting with the control grating 24, the arm 76 is positioned opposite the letter "G" on the scale 78 as shown in FIG. 4, and thereafter the platen 60 is advanced towards the embossing tool until the strip 16 is forced into engagement with the embossing tool 56 by the conventional actuator 61 at a pressure of about 5000 to 7000 pounds per square inch for a period of about 0.3 seconds. The heaters 58 and 64 maintain the cylindrical section 70 of the embossing tool 56 and the platen 60 respectively at a temperature of about 340° to 360° F during the embossing. After the period of about 0.3 seconds, the platen 60 is moved away from the embossing tool 56, and the strip 16 is indexed one position in the direction of arrow 80, whereupon, the process is repeated to emboss the various diffracting gratings like 26, 30 etc. shown in FIG. 3. In the embodiment shown, the platen 60 is a one-tenth inch square, the cylindrical section 70 of the embossing tool has a diameter which is close to two tenths of an inch, and the strip 16 is indexed one-tenth of an inch for each diffraction grating to be embossed thereon. Naturally, the dimensions herein selected represent merely one embodiment to illustrate the invention, and the particular dimensions selected will depend upon a particular application in which this invention will be used. In actuality, the embossing tool 56 and the platen 60 are much closer to each other than shown in FIG. 4, which is shown in this manner for ease of illustration.

The method of embossing the diffraction gratings on the strip 16 just described may be done automatically by using conventional logic circuitry. For example, the data to be recorded may be entered upon a conventional keyboard entry and converter means 84 (FIG. 4) whose output is fed into the printer control 68 which utilizes conventional logic circuitry to actuate the indexing means 66, actuator 61, and indexing means 52 in the manner already described. After the diffraction grating data associated with one credit card is formed on the strip 16, the indexing means 52 is indexed several times to provide a space between the data associated with different credit cards so as to facilitate the cutting of strip 16. After the strip 16 is cut to length, it is embedded in the card 10 as previously described. While it is important that the embossing be done on the side of the strip 16 containing the reflective layer 82 as previously described, it does not seem to matter whether the layer 82 faces the body portion 18 (FIG. 2) of the credit card or the clear plastic layer 20 as far as the reading operation is concerned.

Figure 7:
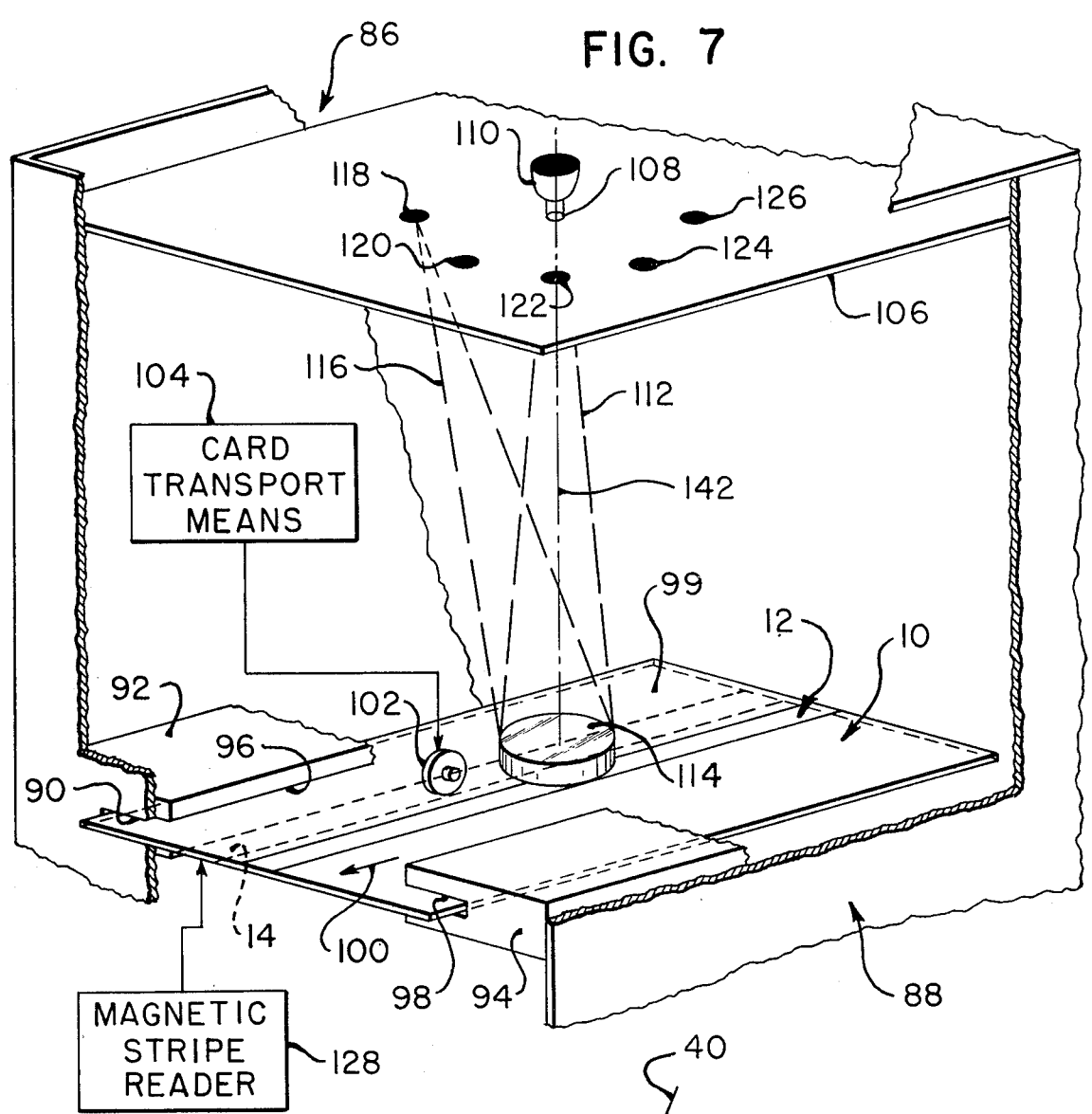
FIG. 7 is a general perspective view of a first reading means for reading the first data or diffraction gratings on a credit card, card transport means for moving the credit card in the reader, and a second reading means for reading the second data on the credit card.

FIG. 7 shows a schematic form of a first reading means or reader 86 which forms a part of this invention. The reader 86 includes a light proof housing 88 having an exit slot 90 therein through which the credit card 10 can emerge and an opposed entrance slot (not shown but similar to slot 90). The housing 88 is shown having several sides thereof broken away to facilitate a showing of the elements included therein. The housing 88 also includes planar support members 92 and 94 having guiding slots 96 an 98, respectively, therein and facing each other to slidably receive the credit card 10 and maintain the first data 12 thereon in a reading plane 99 as the card 10 is moved through the reader 86. The card 10 is moved through the reader 86 along the direction of arrow 100 by a drive wheel 102 which is part of a conventional card transport means 104. The reader 86 also includes an opaque planar support member 106 which is secured in the housing 88 parallel to the reading plane 99 represented by the first data 12 on the card 10. The support member 106 has a pin hole 108 therein, having a diameter of about 0.070 inch, with the longitudinal axis of the hole 108 being perpendicular to the reading plane 99.

A light emitting diode 110 (FIG. 7) is positioned adjacent to the pin hole 108 so that when the diode 110 is pulsed, its light output 112 will be directed through a collimating lens 114 onto a 0.075 inch diameter spot on the diffraction gratings of the first data 12. The light rays 116 which are diffracted from the diffracting gratings like 24, 26, 30, etc., of the first data 12, pass through the collimating lens 114, are concentrated thereby, and fall upon a plurality of photodetectors like 118, 120, 122, 124 and 126 which are mounted in the support member 106. There is one photodetector like 118, 120, which is provided for the first reading means for each character to be read in the first data 12. In the embodiment described, the first data 12 included 12 "characters"; consequently, there would be 12 photodetectors like 118, 120 arranged on the support member 106, although only five such detectors are shown to simplify the drawing. Each photodetector, like 118, is positioned to receive a first order diffracted beam 116 from only one of the diffraction gratings or characters of the first data 12. The particular location of the photodetector like 118 is determined by the diffraction grating principles described earlier herein with reference to FIG. 6. Naturally, second order diffracted beams instead of first order diffracted beams could be utilized in the reading process described herein; however, the first order beams provide reasonably strong signals compared to higher order diffracted beams. The digital representation of the particular diffracting grating like 26, 28 (FIG. 3) is determined by which of the detectors like 118, 120 is activated.

The selection of the light emitting diode 110 (FIG. 7) used in the reader 86 is an important part of the reader 86 because of the need to illuminate a small spot of the diffraction gratings of the first data 12 as brightly as possible.

One type of light emitting diode 110 which may be selected for use in the reader 86 is numbered T1XL-27 and is manufactured by Texas Instruments Corp. This diode 110 operates in the infra-red range having a radiation wavelength centered about 940 nanometers, and is rated at 15 milliwatt output from a square radiating area having a 0.016 inch side. The diode 110 is operated in a pulse mode raising the peak power to a maximum of 90 milliwatts; requiring an input current pulse of 4 amps and a duty cycle of under 10%. The diode 110 performed well when pulsed with a current of 3 amps, for 10 microseconds on with a 10 KHz repetition rate.

The photodetectors like 118, 120 used in the reader 86 (FIG. 7) are photo diodes which are selected to be compatible with the light emitting diodes 110. The photodetectors like 118, 120 used may be type PIN-3D which have an active area of 0.050 × 0.100 inch and are manufactured by United Detector Technology, Inc.

The second data 14 on the card 10 is read by a second reading means or a conventional magnetic stripe reader 128 as shown in FIG. 7, as the card is fed through the reader 86 by the card transport means 104.

As stated earlier herein, when a bank is to issue a credit card 10 made in accordance with the principles of this invention, it will encrypt selected portions of the first data 12 thereon and record the encrypted data in the second data or magnetic stripe 14. Because the particular encrypting scheme is not important to this invention, any conventional encrypting technique may be used.

When the card 10 is used in a security system to check on the validity of the card, the general circuit shown in FIG. 8 may be used. The system includes a conventional control unit 130 for controlling the operation of the card transport means 104, the reader 86 and the magnetic stripe reader 128. As the card 10 is moved by the card transport means 104, the light emitting diode 110 is pulsed as previously described, and the diffracted rays from the first data 12 fall upon the appropriate photodetector like 118, 120 to energize it. The outputs from the photodetectors like 118, 120, (only these two are shown in FIG. 8) are fed into a conventional thresholding amplifier and digital converter 132 which converts the outputs of the photodetectors to binary signals which are compatible with conventional logic circuitry. It should be recalled that the spot of light falling on the diffraction gratings of the first data 12 has a diameter of 0.075 inch, and the individual diffraction gratings like 24, 26, 30 (FIG. 3) are squares having a side dimension of 0.10 inch. Consequently, with a repetition rate of 10,000 pulses per second from the diode 110 on the 0.075 inch spot on the gratings, several readings can be taken as the individual gratings pass under the optical axis 142 (FIG. 7) of the reader 86, and at least two or more identical outputs from a particular photodetector (like 118, 120) can be used or required for a valid reading from each grating (like 24, 26, 30). Also, the particular photodetector like 118, 120 which senses the space gratings 30 (FIG. 3) must be energized between successive data diffraction gratings like 26, 28 as this provides a separation between the characters being read.

The second data 14 is conventionally read by the magnetic stripe reader 128 as the card 10 is moved through the reader 86 by the card transport means 104. The output of the reader 128 is fed into a conventional amplifier and digital converter 134 (FIG. 8). The outputs of the converters 132 and 134 are fed into a conventional comparator means 136 which compares selected portions of the first data 12 and the second data 14 to determine the validity of the card 10 being read and issues a validity signal 138 which is fed into a utilization device 140 which acts upon the validity signal 138. If the utilization device 140 is a cash dispensing machine, for example, and the validity signal 138 indicates that the card 10 is valid, the dispensing machine will proceed with processing the card holder's financial transaction. If the validity signal 138 indicates that the card is invalid, the card 10 would be returned to the user without further processing, or the card may be captured by the machine to prevent further usage of the invalid card.

While this invention has been described in relation to a credit card used in financial systems and the like, it is apparent that the principles of this invention may also be used in many other ways; for example on a record medium which is used in a security system which permits a holder of the card to gain access to a restricted area by passing through a controlled gate area or door which requires the use of a valid card to gain access thereto.

What is claimed is:

1. A security system comprising:
a record medium having first data thereon in a first form and second data thereon in a second form;
first and second reading means for reading said first data and said second data respectively from said record medium;
said first data being in the form of diffraction gratings; an
comparison means for comparing selected portions of said first data read with selected portions of said second data read and for producing a signal which is indicative of the validity of said record medium;
said record medium comprising:
a generally planar body portion;
a first layer of deformable transparent material having a reflective layer, formed on one side thereof and positioned on said body portion and having said diffraction gratings formed in said one side with said reflective layer thereon and arranged thereon in a predetermined order to represent said first data; and
a second layer of protective transparent material covering said first layer of material and being sealed to said body portion to enable said diffraction gratings to be read by said first reading means and to seal said diffraction gratings in said record medium to make said gratings tamperproof.

2. The security system as claimed in claim 1 in which said first layer of deformable material is made of a plastic strip like Mylar which has said reflective layer formed thereon and which is thin relative to its width, and in which said diffraction gratings are arranged in said predetermined order along the length of said strip, with said strip being positioned parallel to a side of said record medium.

3. A security system comprising:
a record medium having first data thereon in a first form and second data thereon in a second form;
first and second reading means for reading said first data and said second data respectively from said record medium;
said first data being in the form of diffraction gratings; and
comparison means for comparing selected portions of said first data read with selected portions of said second data read and for producing a signal which is indicative of the degree of similarity of said first and second data;
said record medium having first and second opposed sides with said first data being located on said first side and said second data being located on said second side;
said record medium having a magnetic stripe on said second side for recording said second data thereon.

4. The security system as claimed in claim 3 in which said first reading means comprises:
means for projecting a source of light on said diffraction gratings;
transport means for moving said record medium with said diffraction gratings thereon relative to said source of light;
said diffraction gratings having a predetermined line pitch and angular orientation which are indicative of said first data; and
detector means for detecting said line pitch and angular orientation of said diffraction gratings as said diffraction gratings are moved past said source of light.

5. A security system for checking the validity of a credit card used in financial systems and the like comprising:
a credit card having first data thereon in a first form and second data thereon in a second form;
first and second reading means for reading said first data and said second data respectively from said card;
said first data being in the form of diffraction gratings; and
comparison means for comparing selected portions of said first data read with selected portions of said second data read and for producing a signal which is indicative of the validity of said credit card;

said credit card comprising:

a generally planar body portion;

a first layer of deformable transparent plastic material having a reflective layer formed on one side thereof and positioned on said body portion and having said diffraction gratings formed in said one side with said reflective layer thereon and arranged thereon in a predetermined order to represent said first data; and a second layer of protective transparent material covering said first layer of material and being sealed to said body portion to enable said diffraction gratings to be optically read by said first reading means and to seal said diffraction gratings in said credit card to make said diffraction gratings tamperproof;

said first layer of plastic material being thin relative to its width, in which said diffraction gratings are arranged in said predetermined order along the length of said strip, with said strip being positioned parallel to the length of said credit card; and said generally planar body portion having first and second opposed sides with said first data being located on said first side and said generaly planar body portion having a magnetic stripe on said second side for recording said second data thereon.

6. A record medium comprising:

a generally planar body portion;

a first layer of deformable transparent material positioned on said body portion and having a plurality of diffraction gratings arranged thereon in a predetermined order to be indicative of data; and a second layer of protective transparent material covering said first layer of material and sealed to said body portion to permit said diffraction grating patterns to be viewed through said second layer and to make said diffraction gratings tamperproof;

said first layer of deformable material having a layer of reflective material formed on one side thereof, with said diffraction gratings being formed in said layer of reflective material and on the side of said layer of deformable material having said layer of reflective material formed thereon; and said first layer of deformable material being in the form of a strip which is very thin in relation to its width and length.

7. The record medium as claimed in claim 6 in which said diffraction gratings have predetermined line pitch and angular orientation indicative of said data, and said first layer of deformable material is positioned on said body portion so that the length thereof is parallel to the length of said record medium.

8. The record medium as claimed in claim 7 further comprising a layer of magnetic material for recording magnetic data thereon and in which said diffraction gratings and said layer of magnetic material are positioned on opposed sides of said record medium to be read from said opposed sides.

9. A method for providing a security check on a record medium comprising the steps of:

a. recording first data in the form of diffraction gratings on a record medium in which said recording step comprises recording said first data on a thin layer of transparent plastic material having a reflective layer formed on one side thereof so that said diffraction gratings are recorded on the side of said layer of plastic material having said reflective layer formed thereon;

b. positioning said thin layer of plastic material on said record medium;

c. sealing said first data on said record medium with a transparent material to made said first data tamperproof but readable;

d. recording second data on said record medium having selected portions which are extracted from said first data to identify said first data but recording said second data in a form different from said diffraction gratings on said record medium;

e. reading said first data and second data when said record medium is in use requiring a security check thereon;

f. comparing said selected portions of said second data with said first data; and g. providing a signal which is indicative by the authenticity of said record medium as determined by said comparing step (f).

10. The method as claimed in claim 9 in which said positioning step (b) is effected by positioning said thin layer of material on one side of said record medium along a line which is parallel to the length of the record medium and said recordig step (d) is effected by recording said second data in a magnetic track which is located on a side of said record medium which is opposite from said one side on which said first data is positioned.

11. A method for producing a credit card for use in a security system comprising:

a. recording data in the form of diffraction gratings according to a predetermined code on a thin layer of material; said recording being effected by embossing said diffraction gratings on said thin layer of material which is made of deformable plastic having a reflective layer formed on one side thereof, and with said embossing being effected on said side of said thin layer of material having said reflective formed layer thereon;

b. positioning said layer of material with said data thereon on a body portion of a credit card; and c. sealing said layer of material from step (b) on said body portion with a layer of transparent material to make said data tamperproof but optically readable.

12. The method as claimed in claim 11 in which said positioning step (b) is effected by positioning said strip on one side of said body portion so that the length of said strip is parallel to the length of said credit card; and further comprising the step (d) of positioning a layer of magnetic material on a side of said body portion which is opposite from said one side for use in magnetically recording second data thereon.

* * * * *

UNITED STATES PATENT OFFICE
CERTIFICATE OF CORRECTION

Patent No. 4,034,211   Dated July 5, 1977

Inventor(s) William R. Horst and William J. Hale

It is certified that error appears in the above-identified patent and that said Letters Patent are hereby corrected as shown below:

Column 9, line 64, delete "an" should be --and--.

Column 10, line 4, delete "," after layer.

Column 12, line 14, delete "made" should be --make--.

line 26, delete "by" should be --of--.

Signed and Sealed this

Fourth Day of July 1978

[SEAL]

Attest:

RUTH C. MASON
Attesting Officer

DONALD W. BANNER
Commissioner of Patents and Trademarks